Patented Dec. 29, 1936

2,066,271

UNITED STATES PATENT OFFICE 2,066,271

FILTER MATERIAL AND METHOD OF MAKING SAME

Chester M. Irwin, Milwaukee, Wis., assignor to Whyt-Rox Chemical Company, Wauwatosa, Wis., a corporation of Wisconsin No Drawing. Application May 27, 1935, Serial No. 23,740

5 Claims. (Cl. 99—220)

This invention relates to improvements in filter materials and method of making same, particularly relating to germicidal materials for destroying harmful bacteria in liquids that contain calcium and/or magnesium salts in solution, and is a continuation in part of my application Serial No. 616,572 filed June 10, 1932.

It is one of the objects of this invention to provide a superior germicidal filter material for destroying bacteria in liquids having exchangeable alkali metal ions, that is formed by combining chemically and mechanically, base exchange zeolite material with the oligodynamic material silver.

A further object of the invention is to provide a bactericidal filter material that, when exhausted, may be recurrently activated whereby its bactericidal properties are restored after periods of use, by passing a weak sodium chloride solution therethrough A further object of the invention is to provide a bactericidal filter material that on activation with a weak non-germicidal solution produces an effluent liquid that possesses germicidal properties useful for sterilizing beds and mechanical filter parts used more particularly, but not solely, for sterilizing water and other fluids.

With the above and other objects in view the invention consists of the improved bactericidal filter material and method of making same and its parts and combinations as set forth in the claims and all equivalents thereof.

The invention contemplates combining the oligodynamic metal silver with the zeolite in such a manner as to produce a heretofore unknown oligodynamic effect. It has been found that the combination of silver with the active zeolite in the manner hereinafter disclosed results in a sterilizing material with markedly improved bactericidal properties for destroying germs in certain liquids as compared to the bactericidal properties of silver when simply coated on ordinary inert carriers such as sand, carbon, silica gel, various types of clays and similar materials.

One of the principal uses of the improved material is for sterilizing water for human consumption. For this purpose soft water such as is produced by the common water softening zeolite is not desirable as it has a flat taste, therefore zeolite is used which is practically exhausted, or in other words has little sodium to exchange with the calcium or magnesium commonly found in natural or untreated water. In other words the zeolite should not contain more than say 30% of its normal alkali metal (sodium) content.

After the bactericidal properties begin to diminish or weaken, a very small amount of salt brine is used to reactivate the material, one tenth or less than the amount that would ordinarily be used to restore the softening properties of the zeolite.

While the exact explanation to account for the extraordinary oligodynamic activity of the oligodynamic metal combined with the alkali base exchange material is not yet clear, it appears that the slight base exchange action set up when liquids containing the alkali metal ions are contacted with the material, produces atomic forces which activate the combined silver, causing a heretofore unknown bactericidal activity.

After a period of time my material becomes lessened in bactericidal efficiency, and a weak brine solution passed therethrough as described above produces a strong non-toxic bactericidal effluent with a strong metallic taste, due to enhanced silver ionization resulting from the exchange of bases in the liquid previously treated, now adsorbed by the zeolite, with the sodium adsorbed from the sodium chloride reactivation.

As an illustration of the effect on the silver caused by base-exchange, the material of this invention, after salt brine reactivation may be submerged in a solution of calcium chloride. A marked change in the appearance and color of the material is immediately noted, showing that the base exchange has altered the character, shape or division of the colloidal silver.

It has been found that it is not necessary to combine more oligodynamic metal with the zeolite than it will adsorb by base exchange. An excess of metal simply reduces the effect of the combination, and the material is to all extents and purposes as inert as a silver coated sand would be.

This can be demonstrated by passing a solution of silver nitrate through the ordinary commercial synthetic zeolite used for water softening. If the solution is not too concentrated, the silver nitrate is completely combined with the zeolite by base exchange and no silver appears in the effluent when tested with a chloride. Therefore it has been found that a proportion of metal of from one fourth of one per cent to four per cent of the weight of the zeolite produces the maximum results in this product.

The silver is combined with the zeolite by base exchange for example submerging the zeolite in a silver nitrate solution and subsequently metallizing by the commonly known reduction methods, which produces the desired result.

The markedly increased bactericidal effect which this improved material has, is a real factor in sterilizing liquids containing alkali metal ions. For example a *B. coli* infected water containing eight grains per U. S. gallon of hardness, when placed in contact with a thoroughly washed granular bed of this material, was sterilized with an efficiency of over 99 per cent on ten minute contact. The softening effect was negligible, the hardness of the water being only reduced to seven grains per U. S. gallon.

Similar tests with the same contaminated water placed in contact for ten minutes with a thoroughly washed silver coated quartz sand of the prior art and of the same grain size and amount of silver as the material of this invention showed a sterilizing efficiency of only 61 per cent.

A similar test run with a thoroughly washed silver coated quartz sand to which had been added a small amount of gold to serve as an activator after the manner of the prior art gave a sterilizing efficiency of only 78 per cent.

Furthermore a stock culture of *B. coli* was made with which was contaminated a quantity of agar solution. The contaminated agar solution was placed in six Petri dishes. Using the same amount of silver in each material (except colloidal silver) a streak of each material was placed across the contaminated agar in the Petri dishes as follows:

Silvered kieselguhr
Silvered quartz
Silvered sand
Silvered silica gel
Silvered sand, activated with a trace of gold
The material of this invention After forty eight hours incubation the sterile area around each streak of material was noted. The material of this invention had a sterile area much greater than that of any of the other materials, including colloidal silver, which from the standpoint of metal content was 100 times more concentrated than the material of this invention.

In order to obtain maximum efficiency in using the material of this invention to treat liquids containing alkali metal ions, it is of course necessary when treating such natural water when complete softening is not desirable, to nearly exhaust the sodium content of the material, which can be done by either washing in a hard water for some time or by submerging in concentrated solution of calcium or magnesium salts.

The metallizing of the silver adsorbed by the zeolite by base exchange is done to give long life to the material, as otherwise its bactericidal efficiency is of much shorter duration.

Silver nitrate may also be combined with the common commercial water softening zeolite by base exchange, and subsequently converted to silver chloride by immersing in a solution of a chloride. This material has high efficiency and can also be reactivated with weak salt brine, but due to the very slight solubility of silver chloride in water the oligodynamic metal content diminishes more rapidly than when the combined silver is metallized. This diminution of efficiency may be restrained by partial metallizing by chemical or photochemical means.

One example of carrying out the invention is as follows:

Take four ounces of synthetic zeolite. Make a solution of silver nitrate containing one gram for each cubic centimeter of distilled water. Submerge the zeolite in this solution or pass the solution through the zeolite several times until silver in an amount ranging from ¼% to 4% of the weight of the zeolite is adsorbed by base exchange. Expose the material to actinic light turning frequently until all grains are well blackened. Then wash thoroughly in hard water until all soluble matter has been removed, and the material is ready for use.

Another example in carrying out the invention is as follows: As in the above example, impregnate the zeolite with the silver nitrate solution by base exchange, then convert to the chloride by submerging the treated silver zeolite in the solution of a chloride, then expose to actinic light until the grains become a deep purple color.

Another example in carrying out the invention is as follows:

As in the above examples, adsorb the silver nitrate solution into the zeolite by base exchange, then metallize by immersing the treated zeolite in a basic solution of formaldehyde, made by adding to a dilute formaldehyde solution an alkali such as sodium hydroxide, caustic potash or slacked lime.

In use the filter material is placed in a container and the water or other liquid to be purified or sterilized is passed through, and in passing through the harmful bacteria are destroyed.

The range of proportions of silver set forth in the claims has been found to be adequate to properly impregnate synthetic and natural zeolites of the alkali metal type. Natural zeolites of the hydrous alumino silicate type are only slightly porous while manufactured or synthetic zeolites are more porous and of higher base exchange capacity, depending on the method of their manufacture, some synthetic zeolites being filter pressed before dehydration and some simply dehydrated from the gel. In either case the common water softening type is used, as it has the property of exchanging its base with the bases commonly found in natural water.

From the foregoing description it will be seen that the germicidal filter material and method of making same, is simple and is efficient in use and is well adapted for the purpose described.

What I claim as my invention is:

1. The method of producing a sterilizing material for liquids containing bacteria and base-exchange elements, which comprises reducing the normal base-exchange alkali metal content of a zeolite to a point where only a partial base-exchange reaction will take place in the presence of the base-exchange elements of the liquid; and impregnating such abnormal zeolite with a bactericidal metal such as silver, which metal will have its bactericidal properties enhanced by said partial base-exchange reaction.

2. The method of producing a sterilizing material for liquids containing bacteria and base-exchange elements, which comprises treating an alkali metal base-exchange silicate with a compound of a bactericidal metal such as silver to effect the replacement by base-exchange of a portion of the alkali metal by the bactericidal metal; treating the base-exchange silicate with an alkali earth metal compound to effect a further replacement of a portion of the alkali metal, but leaving in the silicate a sufficient quantity of said alkali metal to produce a sub-normal base-exchange reaction in the presence of the base-exchange elements of the liquid; and reducing the bactericidal metal in the silicate to metallic form.

3. The method of treating liquids containing exchangeable bases and bacteria to destroy the latter, which comprises bringing said liquids into simultaneous contact with an oligodynamic metal such as silver and a partially exhausted base exchange silicate, the base exchange element of the latter being in an amount sufficient only to set up a weak base exchange reaction, which reaction will activate and improve the bactericidal properties of said metal without materially softening the liquid.

4. A bactericidal material for the killing of bacteria in liquids, comprising a base exchange silicate impregnated with an oligodynamic metal such as silver, the exchangeable-base content of said silicate being not more than 30% of the normal content, whereby in the presence of base exchange elements contained in the liquid only a weak base exchange reaction will take place which will enhance the bactericidal properties of said metal without materially softening the liquid.

5. A bactericidal material for the killing of bacteria in liquids, comprising a nearly exhausted zeolitic material impregnated with silver in an amount not exceeding 4% of the weight of said zeolitic material, and the exchangeable-base content of said material being not in excess of 30% of its normal content.

CHESTER M. IRWIN.